US006619804B2

(12) United States Patent
Davis et al.

(10) Patent No.: US 6,619,804 B2
(45) Date of Patent: Sep. 16, 2003

(54) OPTICAL ENGINE FOR FRONT OR REAR SCREEN SLM DISPLAY SYSTEMS

(75) Inventors: Michael T. Davis, Richardson, TX (US); Douglas W. Anderson, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/036,588

(22) Filed: Dec. 31, 2001

(65) Prior Publication Data

US 2002/0085181 A1 Jul. 4, 2002

Related U.S. Application Data

(60) Provisional application No. 60/259,071, filed on Dec. 29, 2000.

(51) Int. Cl.[7] .............................................. G03B 21/28
(52) U.S. Cl. ......................... 353/98; 353/77; 348/771
(58) Field of Search ...................... 353/69, 70, 74–77, 353/79, 84, 97, 98; 349/5, 7; 348/742, 743, 771

(56) References Cited

U.S. PATENT DOCUMENTS

| 3,623,802 | A | * | 11/1971 | Hubner ........................ 353/23 |
| 5,079,544 | A | | 1/1992 | DeMond et al. |
| 5,452,024 | A | | 9/1995 | Sampsell |
| 5,526,051 | A | | 6/1996 | Gove et al. |
| 6,193,376 | B1 | * | 2/2001 | Hayashi et al. ............... 353/30 |

* cited by examiner

Primary Examiner—Russell Adams
Assistant Examiner—Michelle Nguyen
(74) Attorney, Agent, or Firm—Charles A. Brill; Wade James Brady, III; Frederick J. Telecky, Jr.

(57) ABSTRACT

An optical engine (15) for an SLM-type display system, which may be either a front or rear projection system (10, 20). The optical engine (15) provides for a high contrast, telecentric illumination angle to the SLM (33) without compromising brightness by vignetting due to offset in the pupil. The resulting offset pupil is converted to a telecentric, on-axis image by a relay path (34) between the SLM (33) and the projection lens (37). The relay path (34) places the image at an intermediate image plane accessible by a the projection lens (37), which permits the projection lens (37) to be telecentric without an offset pupil.

19 Claims, 4 Drawing Sheets

OPTICAL ENGINE FOR FRONT OR REAR SCREEN SLM DISPLAY SYSTEMS

This application claims priority under 35 USC §119(e)(1) of provisional application No. 60/259,071 filed Dec. 29, 2000.

TECHNICAL FIELD OF THE INVENTION

This invention relates to image display systems, and more particularly to an optical system for an SLM-based display system.

BACKGROUND OF THE INVENTION

Spatial light modulators (SLMs) have found application in many fields, a significant one of which is image displays. In general, an SLM is an array of light-emitting, light-transmitting, or light-reflecting elements, which are individually addressable, usually with electronic signals. Many SLMs are binary, having an addressing scheme that switches its elements to either an "on" or "off" state to form the image. A characteristic of SLMs is that there is no scanning—all pixels are activated at substantially the same time to generate the entire image or a two-dimensional block of the image, depending on the size of the image and the SLM.

One type of SLM is a digital micro-mirror device (DMD), also known as the digital light processor (DLP), manufactured by Texas Instruments Incorporated. The DMD has an array of thousands of tiny tilting mirrors. To permit the mirrors to tilt, each is attached to one or more hinges mounted on support posts and each is spaced by means of an air gap over underlying addressing circuitry. The addressing circuitry provides electrostatic forces, which cause each mirror to selectively tilt.

For display applications, the DMD is addressed with image data. In accordance with this image data, light is selectively reflected or not reflected from each mirror and projected onto a viewing screen. The combination of light and dark mirrors forms an image. Modulation techniques are used to provide greyscale image "frames". A quick succession of frames is perceived by the viewer as a full motion display.

There are at least two approaches to generating color displays with the DMD display system. One approach is to generate multiple images with multiple SLMs, typically one SLM each for red, green and blue. Each image has a desired intensity, and the images are combined to result in the correctly colored display. A second approach is to use a single SLM and generate images for each color (red, green, and blue) sequentially. A white light source is filtered through a revolving color wheel, such that a desired color illuminates the corresponding image. The differently colored images are generated so quickly that the eye integrates them into the correctly colored frame.

For SLM-based projection systems, there are two basic architectures for the optical system from the light source to the image plane. Each of these architectures has distinct advantages and disadvantages, depending on the type of display system.

Non-telecentric architectures demonstrate superior contrast as compared to telecentric architectures. This is due to the higher illumination angles at the SLM. However, non-telecentric architectures also produce higher projection angles to the screen. This is due to the high amount of lens offset required to separate illumination and projection paths without using a prism or other element. These high angles are not problematic for front screen projection system, but do cause problems for rear-screen projection systems, which need to fold the image into a small cabinet space.

Telecentric architectures do not require offset, and can therefore greatly reduce lens field and screen angle problems. This makes them preferable for rear screen projection systems. However, telecentric architectures have inherently lower contrast due to lower illumination angles on the SLM.

SUMMARY OF THE INVENTION

One aspect of the invention is an optical engine for use in an SLM-based display system. A light source and illumination optics provide high angle illumination to the SLM. The light reflected from the SLM enters a relay path having a first set of lenses, a mirror, and a second set of lenses. The first set of lenses receives the SLM output in an offset pupil. The mirror reflects the light to the second set of lenses, which creates the image at an intermediate image plane. At this point, the image is telecentric and on-axis. A projection lens magnifies the image from the intermediate image plane to a display image plane.

An advantage of the invention is that it combines characteristics of both telecentric and non-telecentric designs. It provides the best features of each, while avoiding their shortcomings.

Like a non telecentric design, the optical path provides a display having optimum contrast. A higher illumination angle is accomplished at the SLM, with the resulting offset being compensated by the relay path.

At the same time, the optical path permits the projection lens to be telecentric and therefor to be smaller than would be the case for a non telecentric design. The offset and working distance of the projection lens can be minimal for the particular application. For different applications, variations to configuration of the projection lens may be easily accomplished, in that the projection lens is easily accessible and can be readily switched with other configuration lenses.

The same optical engine may be used for both front and rear screen projection systems. For front screen systems, the image created by the relay path may be bound by a mask placed within the optical path at a location that is easily accessed. This eliminates the need for a mask on the SLM itself, making the SLM device less expensive and easier to manufacture. This mask in the image plane has the same effect as a cabinet bezel in a rear projection display system, thus enabling front-screen projection with no boundary artifacts outside the active picture area. The high contrast provided by the high-angle optical engine also eliminates the need for special contrast enhancing coatings on a DMD type SLM, as well as preserves black level uniformity due to telecentricity at the SLM.

DETAILED DESCRIPTION OF THE INVENTION

Figure 1:
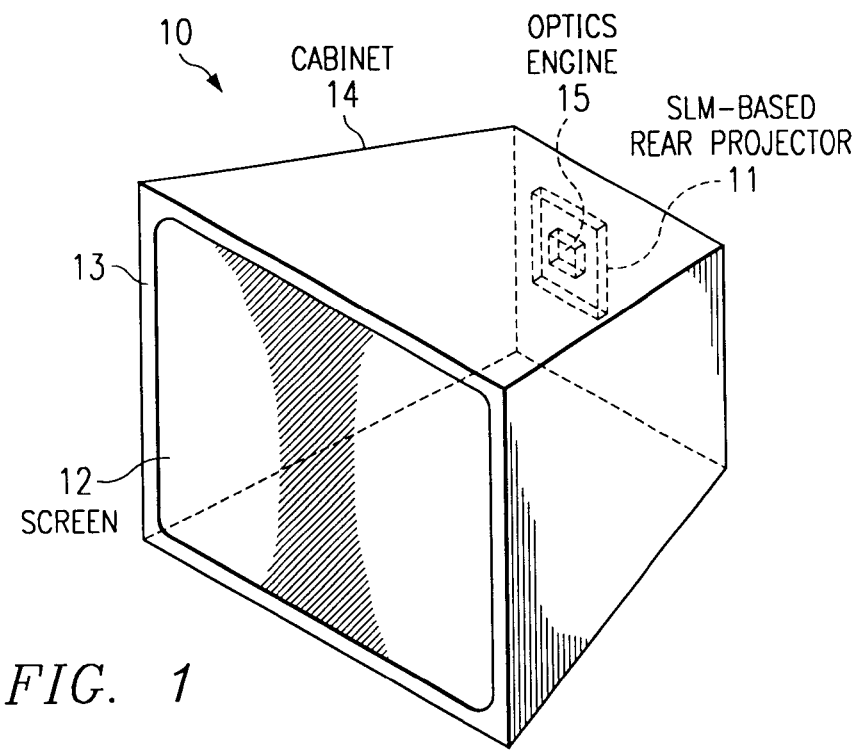
FIG. 1 illustrates a rear projection display system having an optics engine in accordance with the invention.
Figure 2:
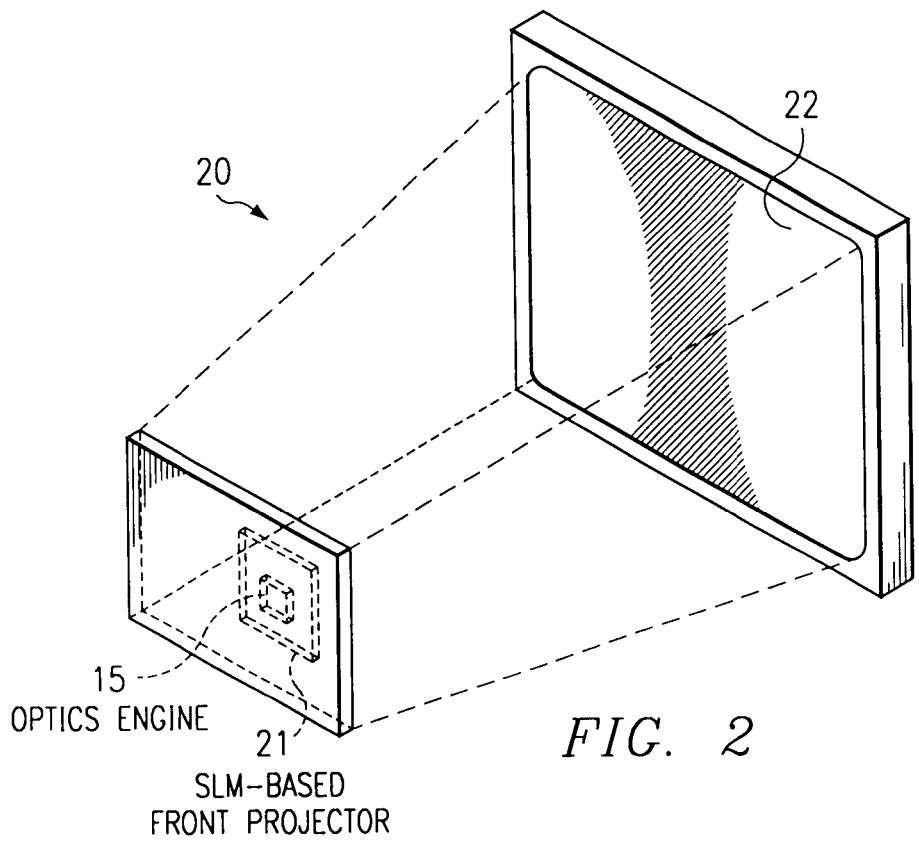
FIG. 2 illustrates a front projection display system having the same optics engine as the system of FIG. 1.

FIGS. 1 and 2 illustrate a rear projection display system 10 and a front projection display system 20, respectively. Each has a projector 11 and 21 designed for that type of system. However, as explained below, within each projector, is a common optics engine 15, suitable for both front and rear projection systems.

Typically, a rear screen system 10 is contained within a cabinet 14. The image is bound by a cabinet bezel 13 that frames screen 12. However, the front screen system 20 has a screen 22, which can display images with stray light image artifacts in the immediate border area outside the active image area. This is because screen 22 is not typically tightly framed to the image.

The following description is directed to the optical engine 15 within the projectors 11 and 21, which includes the SLM. Apart from optics engine 15, projectors 11 and 12 have various components associated with receiving, processing, and storing data for the SLM. Details of a digital micromirror type SLM and its associated electronics are set out in comprehensive descriptions of DMD-based digital display systems, without features of the present invention, are set out in U.S. Pat. No. 5,079,544, entitled "Standard Independent Digitized Video System", in U.S. patent Ser. No. 08/147,249, entitled "Digital Television System", and in U.S. Pat. No. 5,452,024, entitled "DMD Display System." Each of these patents and patent applications is assigned to Texas Instruments Incorporated, and each is incorporated by reference herein.

Figure 3:
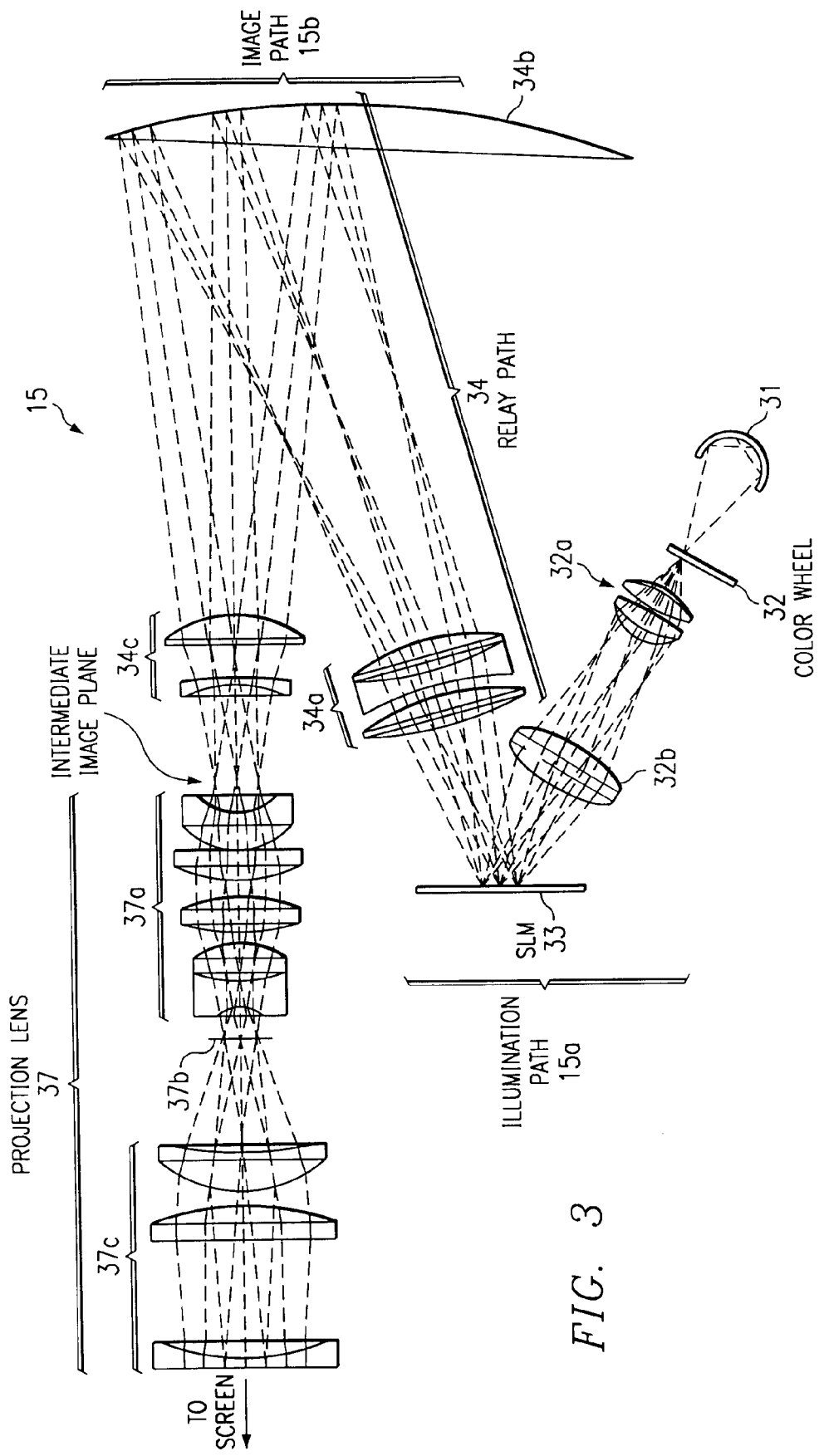
FIG. 3 illustrates the optical engine of FIGS. 1 and 2, which comprises the illumination path, the SLM, and the image path.

FIG. 3 illustrates a portion of projectors 11 and 21, namely the optics engine 15, which is common to both systems. Optics engine 15 primarily comprises an illumination path 15a, the SLM 33, and an image path 15b. As explained below, the illumination path 15a provides high angle illumination, and the image path 15b accepts the offset pupil resulting from the high angle illumination and converts the resultant high-angle projection path into an on-axis telecentric path at the image of the SLM.

This description is in terms of a SLM-type display system that uses a color wheel 32 to filter "field sequential" images. As described in the Background, with each image frame, the color wheel filters white light so as to illuminate the SLM 33 with differently colored light. This permits the SLM to generate a sequence of differently colored images, which are perceived by the viewer as a correctly colored display. However, the same concepts could be applied to an optical path that does not include a color wheel, such as would be the case for a black and white display or a display in which colors are generated by multiple SLM's, or a display in which a single SLM is illuminated by a timed sequence of red, green, blue, and (optionally) white light from discreet sources.

The light source is typically implemented with lamp 31. Examples of suitable lamps are arc lamps and metal halide lamps. A possible alternative might be a solid state white light source, such as one or more white light LEDs (light emitting diode), provided its intensity is sufficient, or one or more red, green, and blue LEDs activated in proper sequence (with or without a color wheel). The light from lamp 31 is focussed through the color wheel 32 and through lenses 32a and 32b.

Color wheel 32 has a motor and control electronics (not shown) that cause it to revolve at a pre-determined rate. As a simple example, color wheel 32 has three segments, one red, one green, one blue. It revolves once for every frame generated by SLM 33 so that each color (red, green, or blue) is displayed for approximately ⅓ of the frame time. Variations on this simple example include revolving the color wheel at n>1 times the frame time, and dividing the red, green, and blue segments into uneven or multiple non-contiguous segments. These variations are designed to reduce artifacts associated with "field sequential" color wheel displays, and/or to adjust color gamut and white-point of the display.

The SLM 33 of FIG. 3 is a DMD type SLM, which reflects light it receives from color wheel 32. Thus, the particular optical path described herein is configured for a reflective type SLM. The concepts described herein could be applied to any type of SLM that can be configured to generate an offset pupil. These might include LCD type SLMs.

The light incident on SLM 33 is telecentric in the sense that all chief rays incident on SLM 33 are essentially parallel. The three ray bundles explicitly illustrated in FIG. 3 represent the rays at the center and two diagonal extremities of the SLM 33. In FIG. 3, it is assumed that the light rays reflected from SLM 33 are from "on" pixels, having an associated reflection angle into relay path 34.

Although the light path from source 31 to SLM 33 is telecentric, it is a "high-angle" light path. This high angle is with respect to an imaginary line perpendicular to the face of SLM 33.

Figure 3A:
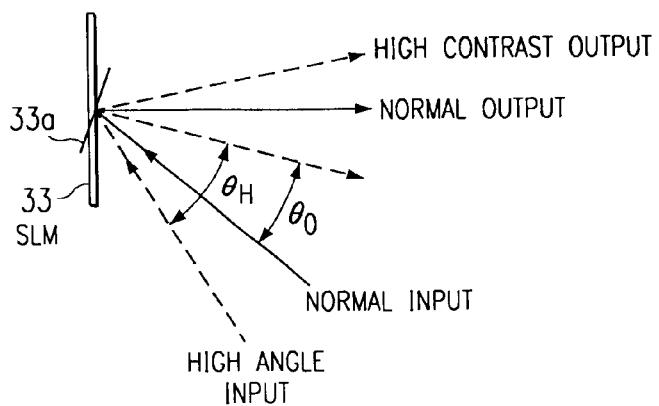
FIG. 3A illustrates the high illumination angle of the illumination path of FIG. 3.

FIG. 3A illustrates the illumination angle of light incident on SLM 33. The illumination angle is the angle between a line perpendicular to the mirror element 33a and the incident light. The angle $\Theta_0$ represents a "normal" illumination angle. The angle $\Theta_H$ represents a "high" illumination angle.

For purposes of this description, a "high illumination angle" is one that is more than twice the mirror tilt angle. More specifically, a "normal" (not high) illumination angle is twice the mechanical tilt angle of the mirror elements in a telecentric system. The reflected and incident rays have equal angles with respect to the surface normal. Thus, in a normal (telecentric) configuration, where the reflected rays are perpendicular to the plane of the array, the incident rays must come in at an angle that is twice the mirror tilt angle. Thus, a "high" angle of incidence is more than two times the mirror tilt angle. However, this additional illumination angle now causes the bundles to exit the DMD at an angle, instead of perpendicular to the array, creating an offset pupil.

In the example of FIGS. 3 and 3A, the mirror tilt angles are +/−10 degrees, which steers the outgoing beam +/−20 degrees. If the illumination angle exceeds 20 degrees, there is increasing separation between the flat and the on state light bundles, whereas with a 20 degree illumination angle, they are essentially tangent to each other. For maximum contrast, the higher the illumination angle, the better. Here, the illumination angle has been increased to improved contrast by a factor of approximately two (2x).

Referring again to FIG. 3, the result of a high illumination angle is a desirable increase in contrast of the displayed image. However, this additional illumination angle results in a projection angle that creates an offset pupil. More specifically, the light from the SLM 33 moves in response to changes in the illumination angle since the tilt angle of the SLM mirrors is fixed (digital). As a result of a high illumination angle, the light reflected from SLM 33 enters a "relay path" 34 with an offset pupil. As explained below, the relay path 34 deals with the offset pupil by relaying it to a non-offset, on-axis intermediate image plane that is readily accessible to the projection lens.

Relay path 34 has a first set of lenses 34a, a mirror 34b, and a second set of lenses 34c. The first set of lenses 34a receives offset light reflected from SLM 33. The light rays pass through lenses 34a offset relative to the center of lenses 34a. As stated above, this offset is a result of the increased illumination angle of the light incident on SLM 33 from source 31. As indicated in FIG. 3, lenses 34a are of sufficient diameter to accommodate the offset. In the example of FIG. 3, the first set of lenses 34a has three lenses—two outer convex lenses and an inner concave lens. The inner concave lens is cemented to the inside surface of the second outer convex lens.

The second set of lenses 34c in the relay path 34 receives light reflected from mirror 34b. It creates an image of the SLM 33, at an intermediate image plane. In the example of FIG. 3, the second set of lenses 34c has two lenses, a convex lens and a lens which is concave/convex, also called meniscus. The intermediate image plane is a field stop. Because the plane is an image of SLM 33, an aperture in this plane will limit the field-of-view required for the subsequent optics, thus minimizing the size of these optics.

Figure 4:
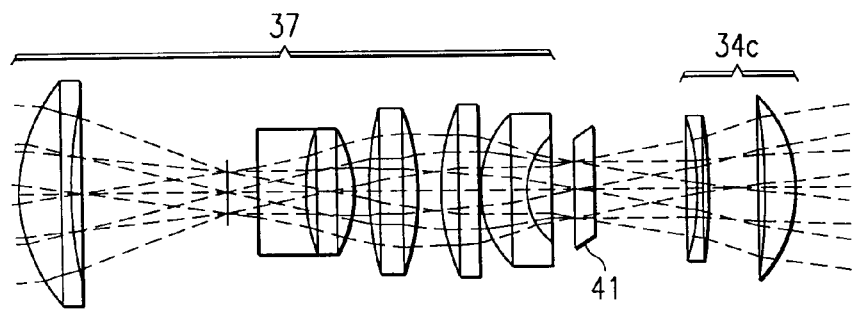
FIG. 4 illustrates how a mask may be placed at the intermediate image plane in the image path of FIG. 3.

Referring to FIG. 4, it is at the intermediate image plane that a field stop aperture 41 may be placed. Field stop aperture 41 may be implemented with a masking element that masks the borders of the image. Although an aperture 41 is useful primarily when the optics engine 15 is used for a front projection display system, it can remain in place for rear screen display systems, or be removed. It may be included as an element of the particular projection lens for the specific application, and therefore be added or removed as the lens is switched for the application. Additionally, access to this intermediate image plane is not physically constrained by other optical components.

Referring again to FIG. 3, the image at the intermediate image plane is telecentric and on-axis. The pupil is approximately at infinity so that the chief rays for the various image points are parallel. This permits the use of a telecentric projection lens 37 with little or no offset as required by the application, which can be smaller than if it were required to receive a non telecentric image which requires large offset in order to separate the illumination and projection paths. That is the amount of offset can be selected for the application rather that be required by the architecture, thus enabling minimal field size for the lens and the smallest size (lowest cost) for the application. It also provides a readily accessible interface that permits interchangable projection lenses to be easily specified and designed, since the location of the pupil is on-axis and at infinity.

In the example of FIG. 4, projection lens 37 has two sets of lenses and eight optical elements. A first set of lenses 37a creates an aperture stop 37b. In the example of FIG. 4, this first set of lenses has five optical elements with the one closest to stop 37b being a doublet. A second set of lenses 37c projects the image to the display screen 12 or 22.

As indicated in FIG. 3, access to the intermediate image plane and to projection lens 37 is unconstrained. This provides a convenient means for interchanging projection lens 37 and inserting a mask 41. Projection lens 37 can be designed with a minimal (or even negative) back working distance. As much or as little offset can be added to projection lens 37 as desired, depending on the type of projection system application.

For a rear projection system 10, projection lens 37 might be a short throw projection lens with minimal working distance and zero offset, resulting in minimal field and lowest screen angles. Such a lens would be small, low cost, and simple.

For a front projection system 20, projection lens 37 would have a longer throw. Some degree of offset for keystone correction could be added. However, projection lens 37 could be designed with a near-zero working distance and offset minimized to only that required for keystone correction, thus achieving the lowest cost design possible for the application requirements. If it were a non-telecentric architecture, then the offset would be dictated by the architectural requirements of the system rather that the needs of the application, and the design would then carry a cost burden decided not by the application.

Figure 5:
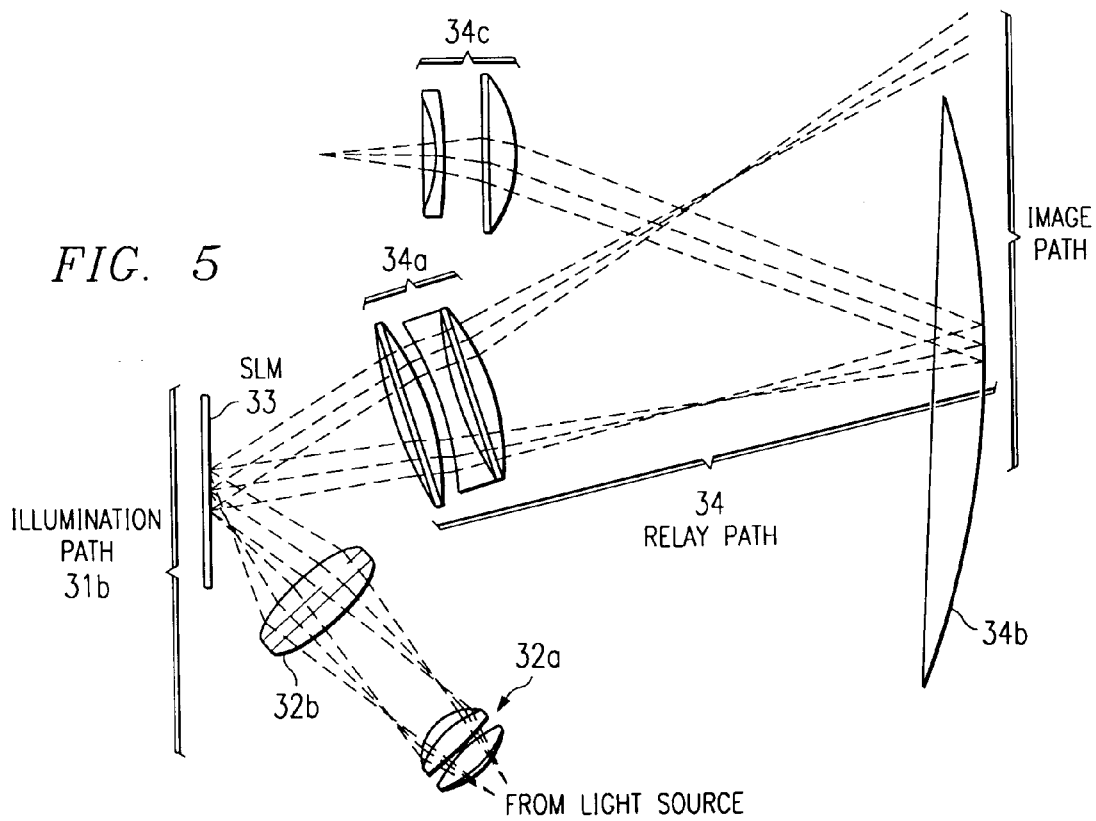
FIG. 5 illustrates how light from flat or off mirror elements of a DMD type SLM fall out of the image path of the optical engine of FIG. 3.
Figure 6:
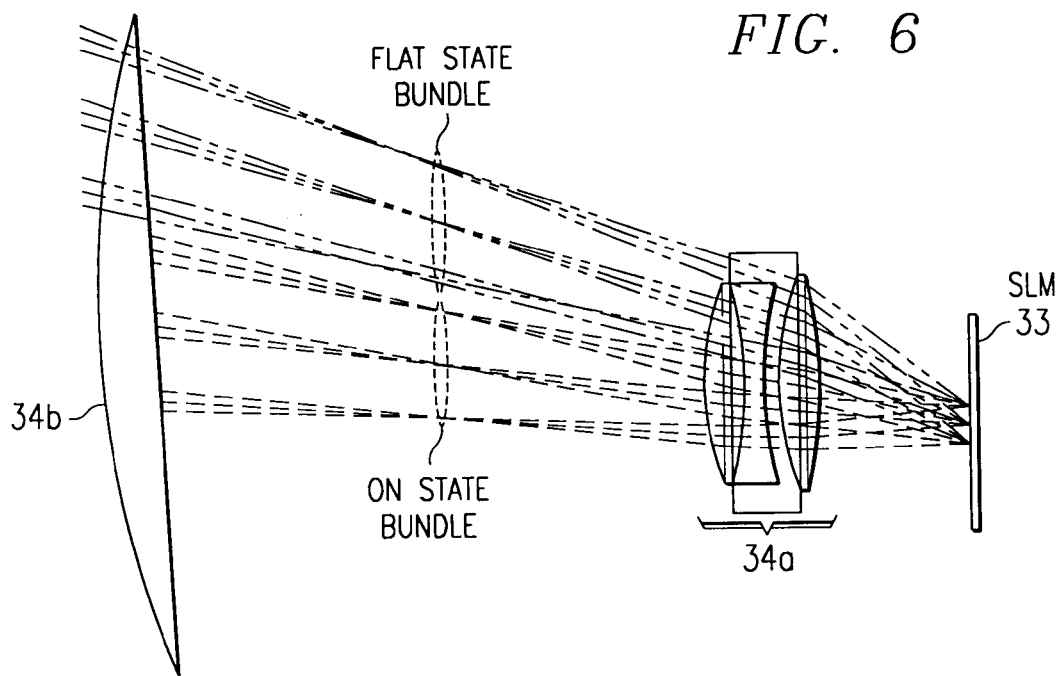
FIG. 6 further illustrates how the flat state illumination is diverted from the optical path.

FIGS. 5 and 6 illustrate a further feature of relay path 34 when SLM 33 is a DMD-type SLM. As indicated, light from flat mirrors tends to be shifted above mirror 34b. Light from off mirror elements would be shifted above mirror 34a to an even greater extent. Because flat and off mirror elements represent dark pixels, this feature of relay path 34 leads to additional improvement in contrast. FIG. 6 is a mirror image of FIG. 5, showing only the light from SLM 33 through the relay path. In FIG. 6, the bundles of rays from on-state and flat-state mirror elements are more completely illustrated. Mirror 34a is shaped to accept the on-state rays.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. An image path for use in an optical engine of an SLM-based display system, comprising:
   relay optics for receiving light reflected from the SLM, the relay path having: a first set of lenses that receives the light from the SLM, a mirror that receives the light from the first set of lenses, and a second set of lenses that receives the light reflected from the mirror;
   wherein the first set of lenses is operable to receive the light from the SLM as an offset pupil;
   wherein the second set of lenses is operable to place the image at an intermediate image plane; and
   a projection lens operable to receive the image from the intermediate image plane and to project and/or magnify the image to a display image plane.

2. The image path of claim 1, wherein the SLM is a DMD type SLM and wherein the first set of lenses directs light from flat pixel elements away from the mirror.

3. The image path of claim 1, wherein the SLM is a DMD and light reflected from off pixel elements is directed away from the mirror.

4. The image path of claim 1, further comprising a mask aperture at the intermediate image plane.

5. The image path of claim 1, wherein the projection lens is telecentric relative to the image from the intermediate image plane.

6. The image path of claim 1, wherein the intermediate image plane is on-axis with no offset, and wherein the relay path includes an offset pupil.

7. An optical engine for use in an SLM-based display system, comprising:
   a light source;

an SLM for receiving light from the light source and for reflecting an image;

relay optics for receiving the image reflected from the SLM, the relay path having: a first set of lenses that receives the image from the SLM, a mirror that receives the image from the first set of lenses, and a second set of lenses that receives the image reflected from the mirror;

wherein the first set of lenses is operable to receive the image from the SLM as an offset pupil;

wherein the second set of lenses is operable to place the image at an intermediate image plane; and a projection lens operable to receive the image from the intermediate image plane and to project the image to a display image plane.

8. The optical engine of claim 7, wherein the SLM is a digital micromirror device.

9. The optical engine of claim 7, wherein the SLM is a DMD type SLM and wherein light from flat pixel elements is directed away from the mirror.

10. The optical engine of claim 7, wherein the SLM is a DMD and light reflected from off pixel elements is directed away from the mirror.

11. The optical engine of claim 7, further comprising a mask aperture at the intermediate image plane.

12. The optical engine of claim 7, wherein the projection lens is telecentric relative to the image at the intermediate image plane.

13. The optical engine of claim 7, further comprising a color wheel for filtering light from the light source.

14. A method of generating images for an SLM-type projection display system, comprising the steps of:

illuminating the SLM with a light source;

generating an image, using the SLM, such that an image is reflected from the SLM;

receiving the image reflected from the SLM into a relay path having the following elements: a first set of lenses that receives the image from the SLM, a mirror that receives the image from the first set of lenses, and a second set of lenses that receives the image reflected from the mirror;

such that the first set of lenses receives the image from the SLM as an offset pupil;

and such that the second set of lenses places the image at an intermediate image plane;

placing a projection lens in front of or inclusive to the intermediate image plane; and projecting the image to a screen.

15. The method of claim 14, wherein the placing step is performed by placing the projection lens telecentric to the image.

16. The method of claim 15, wherein the telecentric projection lens has any amount of offset to the relay axis, including zero.

17. The method of claim 14, wherein the illuminating step is performed with an illumination angle that results in the offset pupil.

18. The method of claim 14, further comprising the step of masking the border of the image at the intermediate image plane.

19. The method of claim 14, wherein the SLM is a digital micromirror device.

* * * * *